April 24, 1945.    W. ERNST    2,374,592
HYDRAULIC PUMP OR MOTOR
Filed Dec. 22, 1941    2 Sheets-Sheet 1

INVENTOR
WALTER ERNST
BY Toulmin & Toulmin
ATTORNEYS

April 24, 1945.  W. ERNST  2,374,592
HYDRAULIC PUMP OR MOTOR
Filed Dec. 22, 1941  2 Sheets-Sheet 2
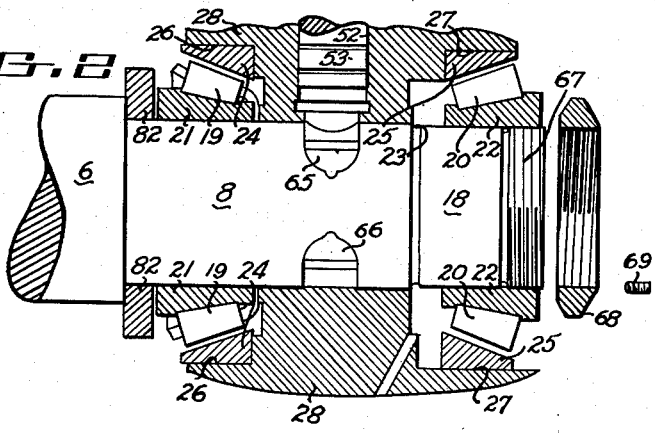
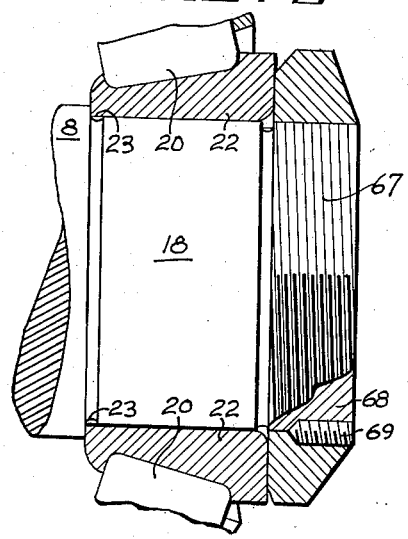
INVENTOR
WALTER ERNST
BY Toulmin & Toulmin
ATTORNEYS Patented Apr. 24, 1945

2,374,592

UNITED STATES PATENT OFFICE 2,374,592

HYDRAULIC PUMP OR MOTOR

Walter Ernst, Mount Gilead, Ohio, assignor to The Hydraulic Development Corporation, Inc., Wilmington, Del., a corporation of Delaware Application December 22, 1941, Serial No. 423,971

2 Claims. (Cl. 103—161)

This invention relates to hydraulic pumps or motors and, in particular, to the adjustment of the bearings supporting the pintle of such pumps or motors.

One object of this invention is to provide an improved adjusting arrangement for facilitating the proper assembly of the bearings supporting the pintle of hydraulic rotary pumps or motors.

Another object is to provide means in connection with the adjustment of the bearings supporting the pintle of rotary pumps or motors, which means will eliminate the provision of shims heretofore required for such adjustment.

Another object consists in the arrangement of the bearings supporting the pintle of the rotary pump or motor so that the entire adjustment of said bearings may be effected from one end of said pintle.

Still another object consists in so arranging the bearings supporting the pintle of a rotary pump or motor that one element of one of said bearings is connected to said pintle so as to prevent any relative movement between said element and said pintle in longitudinal direction of the latter.

These and other objects and advantages of the invention will appear more clearly from the following specification in connection with the accompanying drawings, in which:

Figure 2 shows the bearings supporting the pintle of the pump or motor prior to the proper arrangement of the bearings on said pintle.

Figure 3 is a view similar to Figure 2 with the right hand bearing of Figure 2 properly fixed to the pintle.

Figure 1:
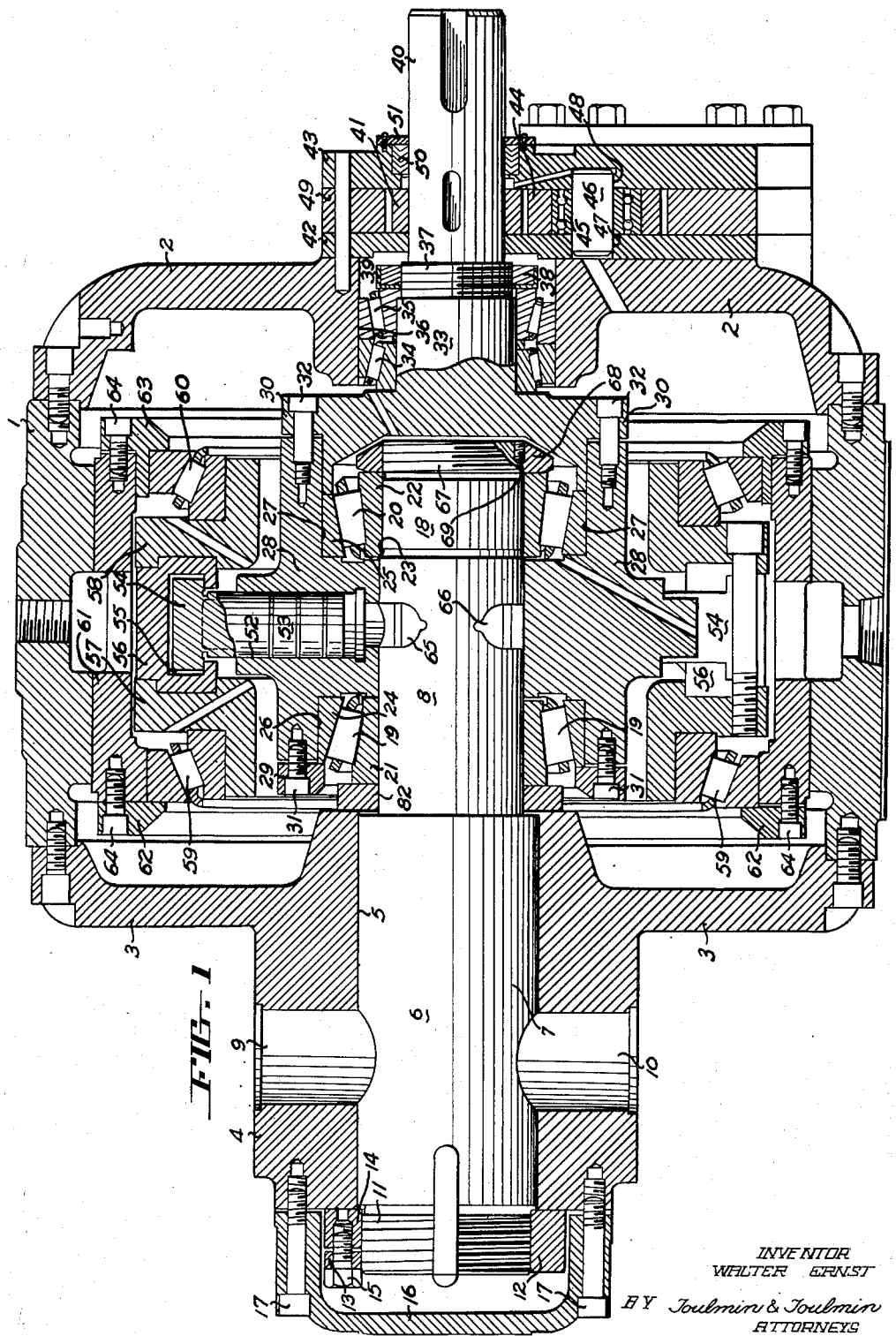
Figure 1 is a central vertical section through a hydraulic pump or motor comprising the bearing adjusting arrangement according to this invention.

Referring to Figure 1 in detail, the hydraulic pump or motor shown therein is of the rotary type and has a cylindrical casing 1 provided with end plates 2 and 3.

The end plate 3 is provided with a boss 4 having a bore 5 adapted to receive the larger end 6 of a pintle, generally designated 7, upon the smaller end 8 of which the moving parts of the pump rotate. The boss 4 is also provided with ports 9 and 10 to provide inlet and outlet passages for the fluid utilized by the pump or motor.

The large portion 6 of the pintle or fluid distributing valve 7 is slidably mounted in the bore 5 and is provided with a threaded portion 11 at its outer end. This threaded portion 11 is engaged by the threaded nut 12 having slit lock portions 13 and 14 which are forced toward or away from one another by means of a lock screw 15 threaded therethrough. These parts are protected by the end cap 16 held against the boss 4 by the screws 17.

The pintle 7 is furthermore provided with a pintle portion 18 of smaller diameter than the pintle portion 8 and preferably forms an integral part with the latter.

Mounted on the pintle portions 8 and 18 respectively are tapered roller bearings 19 and 20, of which the inner race 21 pertaining to the tapered bearing 19 is mounted on the pintle portion 8, whereas the inner race 22 of the tapered bearing 20 is mounted on the pintle portion 18 and abuts a shoulder 23 on the pintle portion 8. The outer races 24 and 25 of the bearings 19 and 20 are mounted in bores 26 and 27 in the cylinder barrel 28 and are held in place by the retaining members 29 and 30 respectively. The retaining member or ring 29 is held in place by the screws 31, whereas the retaining member 30 is similarly attached to the cylinder barrel 28 by means of the screws 32.

The retaining member 30 is provided with a drive shaft portion 33, which is supported by the anti-friction bearings 34 and 35 to enable it to be rotatably mounted in the bore 36 of the end plate 2. The drive shaft portion 33 is provided with a thread 37 which is engaged by the threaded lock ring 38, secured in its place by the lock washer 39.

Mounted on the drive shaft portion 40 connected to the threaded drive shaft portion 37 is a pumping gear 41 arranged between the plates 42 and 43 and meshing with a pumping gear 44 supported by anti-friction bearings 45 upon an axle 46. The axle 46 is mounted in sockets 47 and 48 in the plates 42 and 43 respectively. The plates 42 and 43 are separated by an annular member 49 and form, together with the latter, a casing for the pumping gears 41 and 44. A packing 50 and seal ring 51 are provided for preventing leakage along the drive shaft portion 40.

The cylinder barrel 28 is provided with radial cylinder bores 52 (only one shown in the drawing), each having reciprocably mounted therein a piston 53. Each piston 53 is provided with a cross head 54 adapted to reciprocate tangentially in a slot 55 of a guide block 56.

The guide block 56 is clamped between the secondary rotor halves 57 and 58, which are rotatably supported upon tapered roller bearings 59 and 60. The inner races of these roller bearings are mounted upon the secondary rotor halves 57 and 58, whereas the outer races are supported in the shift ring 61. The outer races of the roller bearings 59 and 60 are held in position by retaining rings 62 and 63 respectively, which are connected to the shift ring 61 by means of screws 64. The shift ring 61 is provided with means for shifting it to and fro, thereby varying the axis of rotation of the secondary rotor halves 57 and 58 with reference to the axis of rotation of the cylinder barrel 28. This eccentricity of axes causes the pistons 53 to reciprocate in the cylinder bores 52 in a manner well understood by those skilled in the art.

The pintle 7 is provided with longitudinal bores (not shown) forming means of communication between the external ports 9 and 10 and the pintle cutouts 65 and 66 respectively. Accordingly, fluid is conveyed to and from the cylinder bores 52 by means of these cutout bores or ports.

The pintle portion 18 is provided at its free end with a thread 67 engaged by a correspondingly threaded nut 68, which is adjustable on the thread 67 so as to properly press the inner race 22 of the tapered bearing 20 against the shoulder 23. To maintain the nut 68 in its adjusted position, a screw 69 may be provided for simultaneously engaging the thread 67 and the nut 68.

To assemble the adjusting arrangement according to the invention, the ring 82 is first slipped on the pintle portion 8, whereupon the tapered roller bearing 19 is mounted on the pintle portion 8 and moved against the ring 82. Then the cylinder barrel 28 is assembled, whereupon the second tapered bearing 20 is mounted on the pintle portion 18 and clamped against the shoulder 23 by means of the clamping nut 68 which then is secured in its position by the screw 69. Preferably the inner race 22 is pressed upon the pintle portion 18 so as to be tightly connected to the latter.

Finally, the pintle is assembled in the pump casing formed by the cylindrical casing 1 and end plates 2 and 3, and the pintle nut 12 is threaded upon the thread 11 of the pintle and drawn up tightly. In case it is necessary to make up for the wear of the bearings, caused by operation of the pump, it is merely necessary to adjust the nut 12.

As will be clear from the above, no testing or selecting of shims is required for the assembly of the pintle, in contrast to similar adjusting arrangements previously used. Furthermore, the bending forces exerted upon the nut 68 are materially less than the bending forces exerted upon the previously used plate 80, since the lever arm effective for the dishing of the plate 80 counts from the periphery of said plate to the axis of the screws 81, whereas in the new adjusting arrangement the lever arm merely counts from the thread 67 to the periphery of the nut 68.

By pressing or shrinking the inner race 22 for the tapered bearing 20 upon the pintle portion 18, a great part of the stress exerted upon the bearing 20 during the operation of the pump will be directly transferred from the inner race 22 to the pintle portion 18, thereby further decreasing the bending forces which may act upon the nut 68.

By reversing the direction of rotation of the lock nut 12, it is obviously possible to loosen the bearings if they happen to be too tight in their adjustment. The operation of tightening or loosening the bearings can evidently be conducted without dismantling the pump and, accordingly, the cylinder barrel 28 can be made to rotate relative to the pintle portion 8 with as little lost motion therebetween as may be desired.

It will be understood that I desire to comprehend within my invention such modifications as come within the scope of the claims and the invention.

Having thus fully described my invention, what I claim as new and desire to secure by Letters Patent, is:

1. In a hydraulic pump or motor, a casing, a cylinder body comprising a plurality of cylinders with pistons therein rotatably mounted in the casing, a valve member for distributing fluid to and discharging it from said cylinders, said valve member having an annular shoulder near one end and a threaded portion adjacent the opposite end of its portion within said casing, tapered anti-friction bearings having inner and outer races interposed between the cylinder body and the valve member for allowing relative rotation thereof, a second shoulder on the valve member located adjacent said threaded portion, said second shoulder forming an abutment for the inner race of one of said anti-friction bearings, the surface between the second shoulder and the threaded portion being of less axial extent than that of the inner race supported thereby, nut means engaging said threaded portion for clamping the said inner race against the second shoulder, and means on the opposite end of the valve member from said threaded portion for adjusting the valve member relative to the cylinder body.

2. In a hydraulic pump or motor, a casing, a cylinder body comprising a plurality of cylinders with pistons therein rotatably mounted in the casing, a valve member for distributing fluid to and discharging it from said cylinders, said valve member having an annular shoulder near one end and a threaded portion adjacent the opposite end of its portion within said casing, tapered anti-friction bearings having inner and outer races interposed between the cylinder body and the valve member for allowing relative rotation thereof, a second shoulder on the valve member located adjacent said threaded portion, said second shoulder forming an abutment for the inner race of one of said anti-friction bearings, the surface between the second shoulder and the threaded portion being of less axial extent than that of the inner race supported thereby, nut means engaging said threaded portion for clamping the said inner race against the second shoulder, and means on the opposite end of the valve member from said threaded portion for adjusting the valve member relative to the cylinder body, said threaded portion being of substantially the same diameter as said inner race supporting surface.

WALTER ERNST.